(12) United States Patent
Haleluk

(10) Patent No.: US 9,016,194 B2
(45) Date of Patent: Apr. 28, 2015

(54) SANDWICH COOKIE DIPPER

(76) Inventor: Robert Haleluk, New York, NY (US)

(*) Notice: Subject to any disclaimer, the term of this patent is extended or adjusted under 35 U.S.C. 154(b) by 1122 days.

(21) Appl. No.: 12/807,225

(22) Filed: Aug. 31, 2010

(65) Prior Publication Data

US 2012/0048128 A1    Mar. 1, 2012

(51) Int. Cl.
 A23B 4/02    (2006.01)
 A23B 4/00    (2006.01)
 A47G 21/00   (2006.01)
 A23N 15/08   (2006.01)
 A23N 4/08    (2006.01)

(52) U.S. Cl.
 CPC .............. *A47G 21/00* (2013.01); *A23N 15/08* (2013.01); *A23N 4/085* (2013.01)

(58) Field of Classification Search
 CPC ........ A23G 9/045; A23N 4/085; A23N 15/08
 USPC ............. 99/275, 494, 516; 294/99.2
 See application file for complete search history.

(56) References Cited

U.S. PATENT DOCUMENTS

| | | | | |
|---|---|---|---|---|
| 1,542,503 A * | 6/1925 | Haidle | | 294/26 |
| 2,765,799 A * | 10/1956 | Ritter | | 132/309 |
| 3,110,304 A * | 11/1963 | Hartman | | 600/200 |
| 4,023,844 A * | 5/1977 | Roberts | | 294/26 |
| 4,182,004 A * | 1/1980 | Haring et al. | | 452/187 |
| 4,660,875 A * | 4/1987 | Ziegler | | 294/26 |
| 5,149,161 A * | 9/1992 | Smith | | 294/26.5 |
| 5,806,409 A | 9/1998 | Johnson et al. | | |
| D406,339 S * | 3/1999 | Stacks | | D24/137 |
| 6,595,110 B1 | 7/2003 | Huang | | |
| D519,004 S * | 4/2006 | Archer | | D7/692 |
| 7,074,230 B2 * | 7/2006 | Olson | | 606/162 |
| D579,736 S * | 11/2008 | Cotter et al. | | D7/669 |
| 7,552,674 B1 * | 6/2009 | Cotter | | 99/426 |
| 2004/0244596 A1 * | 12/2004 | Ogline | | 99/275 |
| 2005/0109222 A1 * | 5/2005 | Swenson | | 99/494 |
| 2006/0021989 A1 * | 2/2006 | Friedman | | 220/703 |
| 2006/0021990 A1 * | 2/2006 | Friedman | | 220/703 |
| 2007/0068948 A1 * | 3/2007 | Friedman | | 220/501 |
| 2008/0076089 A1 * | 3/2008 | Vu | | 433/143 |
| 2009/0056560 A1 * | 3/2009 | Kowlessar | | 99/484 |
| 2009/0133586 A1 * | 5/2009 | Kowlessar | | 99/484 |
| 2009/0255417 A1 | 10/2009 | Smith | | |

* cited by examiner

*Primary Examiner* — Dana Ross
*Assistant Examiner* — Hemant Mathew
(74) *Attorney, Agent, or Firm* — John F. Vodopia

(57) ABSTRACT

A sandwich cookie dipper for dipping sandwich cookies in milk includes a handle, a cookie cradle and a transition element that interconnects to and sets off the cookie cradle from the handle. The cookie cradle comprises a thin, resilient rod-like member configured to substantially conform to a part of an outer circumference of a crème layer sandwiched between two disk-like cookie members of a sandwich cookie. The sandwich cookie secured thereby is less likely to dislodge as it is dipped and brought to the cookie eater's mouth.

13 Claims, 6 Drawing Sheets

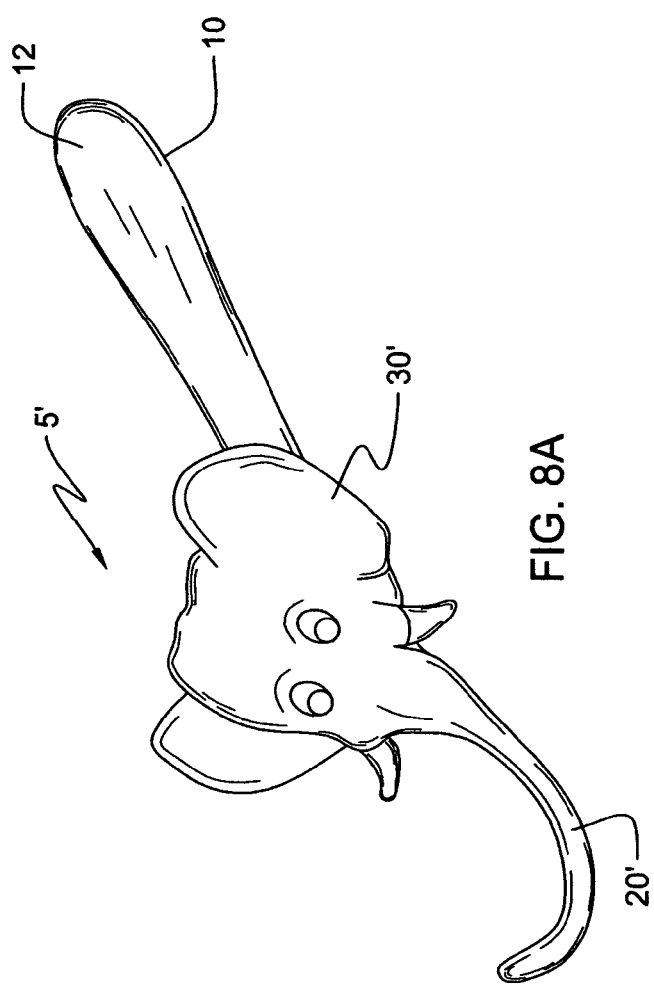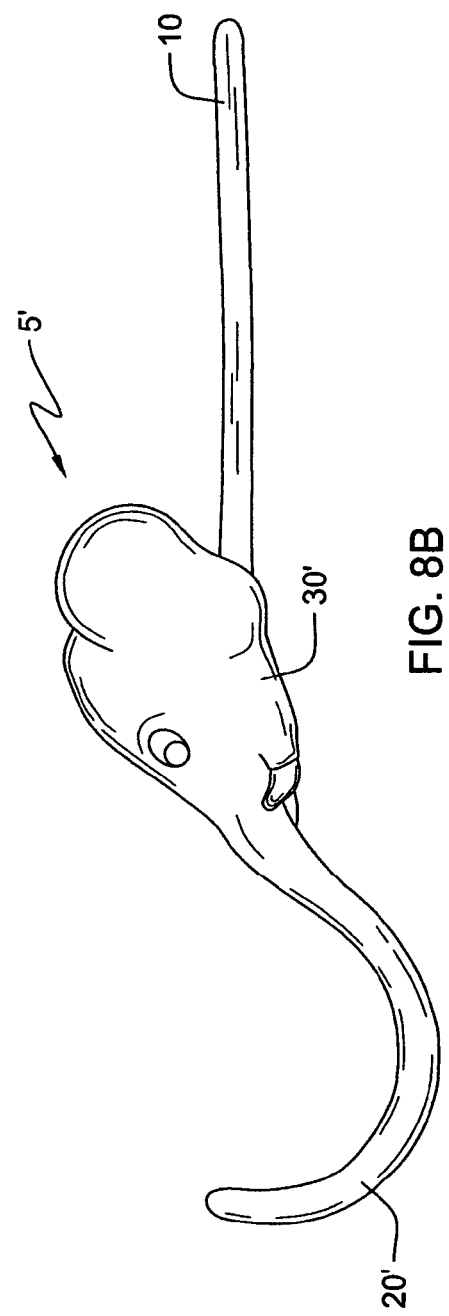

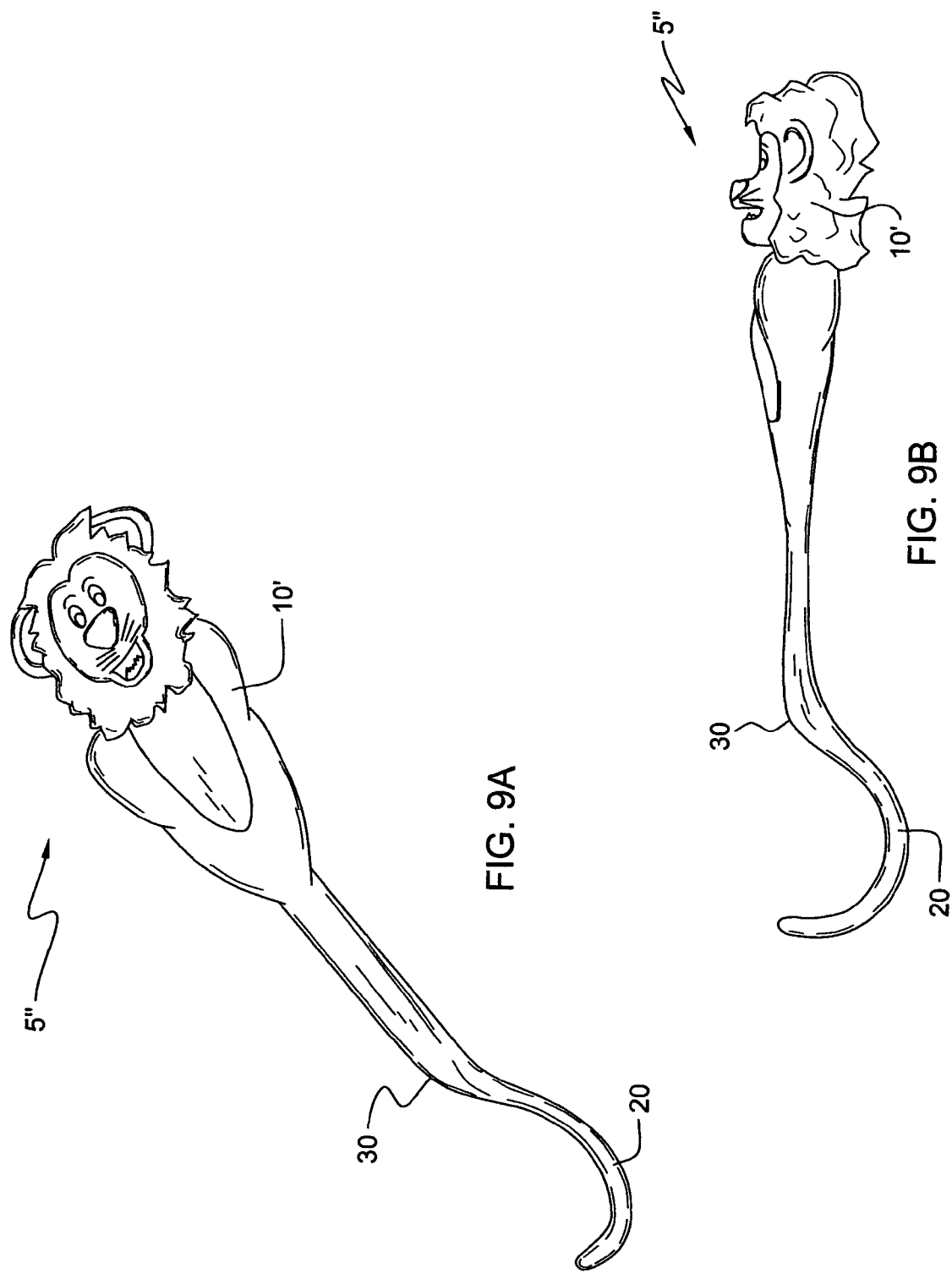

SANDWICH COOKIE DIPPER

BACKGROUND OF THE INVENTION

The present invention broadly relates to cookie dippers and, more particularly relates to a sandwich cookie dipper for holding and dipping a sandwich cookie in a liquid (e.g., milk), such that the dipped cookie may be withdrawn from the liquid and transported to a cookie eater mouth with minimal likelihood of crumbling or dislodging from the sandwich cookie dipper.

Sandwich cookies comprise two disc-like cookie members arranged/separated in a substantially parallel relation by a crème layer, FIG. 1 is a perspective view of a conventional sandwich cookie (1). While sandwich cookies come in various sizes, those found in snack-food sections of any US supermarket are generally formed with disc-like cookie members (2) that are between 1" and 2" in diameter and between ⅛" and ⅜" thick. The cookie members (2) are separated by a crème layer (3). While the amount of crème in the crème layer (3) may vary (e.g., single layer, double layer, triple layer), the crème layer in a conventional single layer sandwich cookie (1) is about 1/16" to ¼" thick. The crème layer (3) is inherently disk-shaped, being located between the two cookie members (2). An outside diameter of the disk-shaped crème layer is normally slightly less than an outside diameter of the cookie members (2). For example, an outside diameter of the disk-like crème layer (3) might be 1 7/16" where an outside diameter of the cookie members (2) is 1½", thereby defining a "gap" between the outer edges of the cookie members, as shown in FIG. 2.

While cookies in general and sandwich cookies in particular may be enjoyed by themselves without a beverage, quite frequently cookies are consumed with milk, coffee, tea, etc. (hereinafter, "milk"). For that matter, cookies are frequently dipped in milk to saturate all or some part of the cookie before eating. And as any child or adult who has dipped cookies knows, cookie dipping can be a pretty messy undertaking.

By dipping, a cookie (a single disc cookie or a sandwich cookie, as described) is grasped between a thumb and forefinger and dipped into the milk in a container, e.g. a glass or cup of milk. Using this simple technique, dipping the entire cookie requires submerging part of the fingers holding the cookie, with the cookie. Upon dipping, all or part of the cookie is held in or completely under the milk for a time, during which milk is absorbed. Then, the saturated or partially saturated cookie is lifted out of the milk and hopefully maintains its structural integrity as it makes its way to the cookie eater's mouth (i.e., the dipper's or another intended recipient's mouth).

Of course any experienced cookie dipper knows that the whole dipped cookie can at times crumble or fracture, such that some part of or the entire dipped cookie never makes it to the intended mouth. Such a post-dipped cookie mishap is a result not necessarily of shoddy sandwich cookie design so much as cookie dipping force majeure. For that matter, there appears to be a direct correlation between the amount of time during which a cookie is dipped (and therefore an amount of liquid volume absorbed) and a likelihood of cookie crumbling or fracture en route to a mouth, post dipping.

For that matter, as the sandwich cookie saturates, the pressing force of the fingers holding a cookie in the milk container may facilitate breakage or even disintegration of the milk-absorbing cookie in the milk container. It appears that a cookie grasping force is normally (and unintentionally) slightly increased as the dipper, deciding that enough milk has been absorbed, begins removing and transporting the milk-absorbed cookie though the open air towards its intended end location. The extra squeeze is at times enough to result in a crumbling and consequential loss of all or part of the already mil-saturated cookie. Of course the saturated cookie must travel over the setting upon which the milk container is positioned, the cookie dipper's clothing and exposed body parts and under some circumstances, keyboards, laptops, video games, board games, desktops, flooring, etc., without limitation, depending on the cookie eater's habits.

In order to minimize the messiness of dipping cookies, various apparatus have been developed. For example, US Patent Appln. Pub. No. 2009/0056560 ("the '560 application"), published Mar. 5, 2009, depicts a sip and dip cookie apparatus 100 (see FIGS. 1 and 2), designed to hold and dip cookies in a liquid, while some portion of the liquid is concurrently consumed with a straw S. To accomplish same, sip and dip cookie apparatus 100 comprises a straw holder 120 and a detachable cookie holder 140 into which a cookie C is placed before dipping. The straw holder 120 also serves as a handle so that a cookie dipper can hold and dip the apparatus in a glass G of milk M. The straw S is shown fitted inside the straw holder 120, and the cookie C is shown disposed inside the detachable cookie holder 140. FIG. 2 is a perspective view highlighting that the detachable cookie holder 140 includes first and second side inserts 220 and 240, respectively. The side-inserts 220 and 240 are intended to keep the cookie C inside the detachable cookie holder 140 (see side holes 260 that are required for liquid flow).

During ordinary use of the sip and dip cookie apparatus 100, the cookie C is placed inside the detachable cookie holder 140, and the sip and dip cookie apparatus 100 is dunked. The cookie C absorbs milk while in the detachable cookie holder 140. For that matter, it appears that the sip and dip apparatus 100 including the cookie C in cookie holder 140 is intended to remain immersed while the cookie eater concurrently consumes milk via straw S. But as suggested above, maintaining a cookie for too long in milk can have a negative effect on the cookie C. That is, the cookie will likely become overly saturated in the cookie holder 140 while the cookie eater focuses more on sipping rather than on dipping (and eating). The texture of a super saturated cookie structure quickly mushy and difficult to handle.

US Patent Appln. Pub. No 2009/0133586 ("the '586 application"), published May 28, 2009, is a continuation-in-part (CIP) application of the '560 application. The '586 application describes a modification of the sip and dip cookie apparatus 100 first disclosed in the '560 application, wherein the lower portion 140 includes both fixed sidewalls 340, 360 (which are not detachable), and a cookie cover 160 (FIG. 2). Cookie cover 160 comprises generally a flat and elongated curve shape having opposite first and second ends 180 and 200, respectively (as detailed in FIG. 2). Once a cookie C is inserted into lower portion 140, a protrusion 205 at the second end is grasped and moved up towards internal void 220 to enclose the cookie in what may be described as housing. The cookie cover 160 is retracted to remove the cookie after dunking and drinking with straw S.

Like the sip and dip cookie apparatus 100 of the '560 application, use of the sip and dip cookie apparatus 100 of the '586 application tends to result in super saturated cookies with limited structural integrity. There is no easy way of removing a super saturated cookie C from a respective cookie holder 140, with or without sidewalls 340, 360 and cookie cover 160. It appears that both apparatuses must be overturned (and possibly tapped) to remove a dipped cookie present in a holder 140, particularly in a case where the cookie C has become mushy, or otherwise adhered to part of the cookie holder. As such, the sip and dip cookie dippers 100 frequently must be cleaned, or are used by children without cleaning. Turning the sip and dip cookie over to "knock" them against something solid to dislodge cookie fragments or mush can result in a messy eating area.

Of course such saturated cookie extraction problems limit the pleasure of the cookie dipping and eating experience. For that matter, the numerous surfaces and edges comprising sip and dip cookie apparatuses 100 tend to capture liquid, which may then drip off the apparatuses as they are moved with the saturated cookie after dipping and extraction from the milk container. A secondary problem with such designs is that they comprise a substantial mass, so that when dipped, a large amount of liquid is displaced, likely resulting in overflow/spillage. That is, depending on how much milk is included in the milk container into which the apparatuses are dipped, and/or the fastidiousness of the cookie dipper/eater, overflow is likely at dipping.

SUMMARY OF THE INVENTION

The present invention provides a sandwich cookie dipper designed to overcome the shortcomings of the prior art.

The sandwich cookie dipper of the invention comprises a simple handle and sandwich cookie cradling element attached or connected to the handle. The cookie cradle element comprises a thin, curved cylindrical rod or arm-like holder into which the sandwich cookie is placed so that the circumferential edge of the sandwich cookie is supported by the curved holder. For that matter, the arm-like holder contacts the outside diameter of the crème layer and/or some outermost part of the inside walls of the two disk-like cookie members. This contact and gravity hold the sandwich cookie stably in the holder so that it is not dislodged (before and after dipping) with normal movements. As the holder only contacts the lower half of the circular cookie's circumference, the top half of the cookie is accessible to the eater's mouth without contact with the sandwich cookie dipper.

In one embodiment, the invention includes a sandwich cookie dipper for dipping sandwich cookies in milk includes a handle, a cookie cradle and a transition element that interconnects to and sets off the cookie cradle from the handle. The cookie cradle comprises a thin, resilient rod-like member configured to substantially conform to a part of an outer circumference of a crème layer sandwiched between two disk-like cookie members of a sandwich cookie. The sandwich cookie secured thereby is less likely to dislodge as it is dipped and brought to the cookie eater's mouth.

The resilient rod-like member is configured for insertion into a gap between the disk-like cookie members in the part of the outer circumference of the crème layer in order that the sandwich cookie is supported thereon. Preferably, the resilient rod-like member is configured in a substantially circular arc which extends from the connecting element, which is formed as partial circumference of a circle defined by a radius that is smaller than or equal to a radius of a sandwich cookie to be cradled thereby. The partial circumference is equivalent to an arc length subtended by an angle of between 120° and 180°. The angle subtending the arc length is most preferably 180°.

The cookie cradle is configured to be stretched or expanded to receive the sandwich cookie, wherein upon relaxation after stretching operates to grip a portion of the outer circumference of the crème layer. The handle, the cookie cradle and the transition element preferably are formed as one piece, and most preferably by injection molding. The various elements may be formed of plastic, rubber-like material for safety purposes or other various materials approved for use in the manufacture of food containers or eating utensils. Preferably, the handle is formed with at least one surface upon a part of which a communication is disposed.

The sandwich cookie dipper may further include that the handle is formed as a three dimensional shape, wherein the three-dimensional shape is a facial replica or caricature. Alternatively, the sandwich cookie dipper may further include that the transition is formed as a three-dimensional shape, wherein the three-dimensional shape is a facial replica or caricature.

In an alternative embodiment, a sandwich cookie dipper comprises a handle and a sandwich cookie cradle attached to the handle. The cradle is formed from a thin, resilient rod-like material extends down and away from a central axis of the handle, along a half-moon-like path which loops back upwards to a point aligned with said central axis, the path defined by a circular arc length subtended by an angle of less than or equal to π radians. The radius of the path is less than or equal to a radius of a crème layer of a sandwich cookie to be upon the cradle such that the wire-like material is positioned between cookie members sandwiching the crème layer.

The sandwich cookie dipper may include that at least one surface has at least one communication disposed thereon, for example, a manufacturer's logo or brand. The communication is preferably disposed upon at least one surface of the handle. In addition, the sandwich cookie dipper may further include that the handle is formed as a three-dimensional shape, wherein the three-dimensional shape is a facial replica or caricature. Alternatively, the sandwich cookie dipper may further include that the transition is formed as a three-dimensional shape, wherein the three-dimensional shape is a facial replica or caricature.

BRIEF DESCRIPTION OF THE DRAWINGS

The present invention can best be understood in connection with the accompanying drawings. It is noted that the invention is not limited to the precise embodiments shown in drawings, in which:

FIGS. 8A and 8B are front perspective and side views of another embodiment of a sandwich cookie dipper of the invention; and FIGS. 9A and 9B are front perspective and side views of yet another embodiment of a sandwich cookie dipper of the invention.

DETAILED DESCRIPTION OF THE INVENTION

Figure 1:
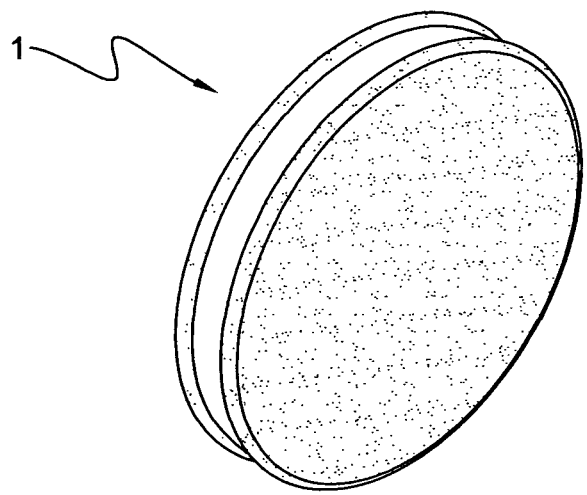
FIG. 1 a perspective view of a conventional sandwich cookie.
Figure 2:
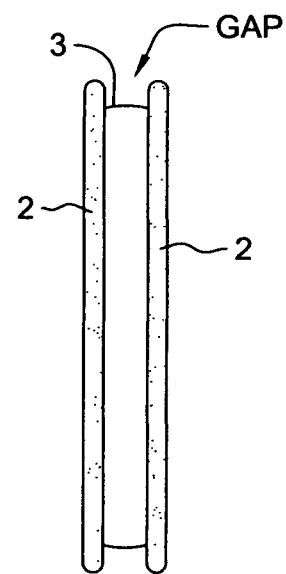
FIG. 2 is a side view of a conventional sandwich cookie, highlighting its construction.
Figure 3:
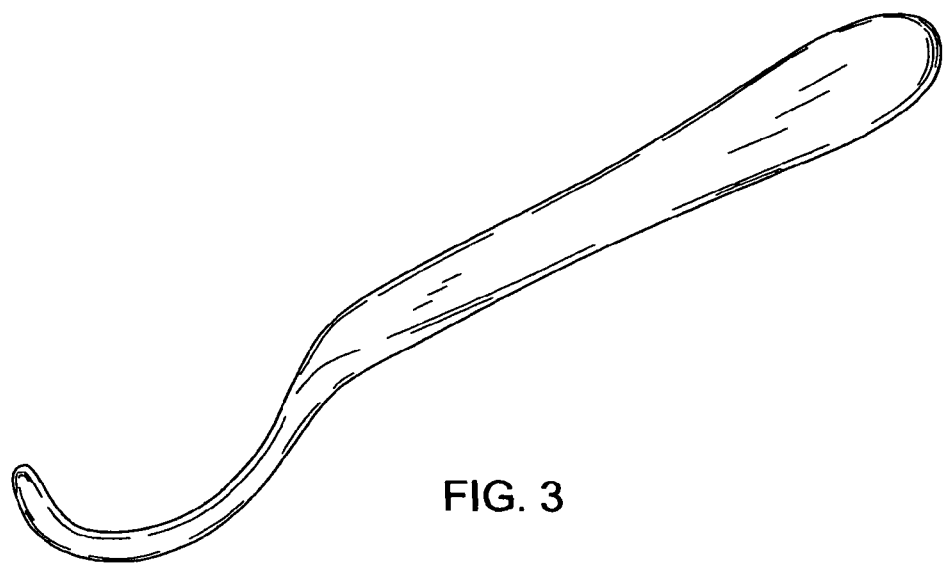
FIG. 3 is a perspective view of a sandwich cookie dipper of the invention.

The following is a detailed description of example embodiments of the invention depicted in the accompanying drawings. The example embodiments are in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Turning now to FIGS. 3-9, the disclosure describes various embodiments of the inventive sandwich cookie dipper (5, 5', 5").

In one embodiment, sandwich cookie dipper (5) comprises a handle (10) and a cookie cradling element, i.e., cookie cradle (20). Cookie cradle (20) is integrally formed with or otherwise connected to the handle (10) at a connecting element (30). Preferably, the handle (10), connecting element (30) and cookie cradle (20) are formed as one integral structure in a one-piece design, but are not limited thereto. The connecting element (30) acts as a transition that connects the handle (10) and cookie cradle (20), and couples forces communicated between the handle and cookie cradle.

In the embodiment shown, the handle (10) is approximately 5" long, ⅛" thick and about ⅞" wide at its widest point at the handle end (opposite the cookie cradle end). The cookie cradle (20) comprises a thin, curved cylindrical rod or arm-like construction for flexibility, formed as a half-moon or loop with a circumferential length that is the same size or smaller than a circumferential length of a sandwich cookie lower half. The half-moon or loop opens upward to receive part of the sandwich cookie edge (the lower half edge).

More specifically, the cookie cradle is configured in a substantially circular arc with a 1" radius such that an arc length of about π" subtends an angle of about 180° (π radians). The arc length extends from the connecting element (30). The sandwich cookie dipper (5) is formed with a non-toxic material, such as plastic, rubber or composite materials, having a composite strength sufficient to accommodate the weight of the cookie before and after it is saturated with fluid (e.g., milk). The cookie cradle (20) must be resilient so if bent, or expanded to receive a cookie, it will normally restore to its pre-expanded shape to securely contact the sandwich cookie/crème layer upon release of the expanding force. For that matter, the sandwich cookie dipper may be formed as a single structure, or in parts, using any known method of manufacture, for example, injection molding, without deviating from the scope and spirit of the invention.

Figure 4:
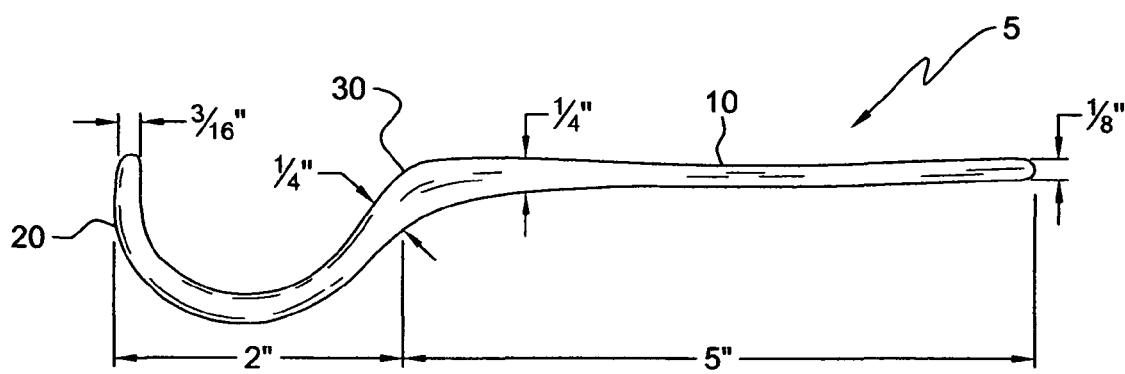
FIG. 4 is a side plan view of the a sandwich cookie dipper of FIG. 3.
Figure 5:
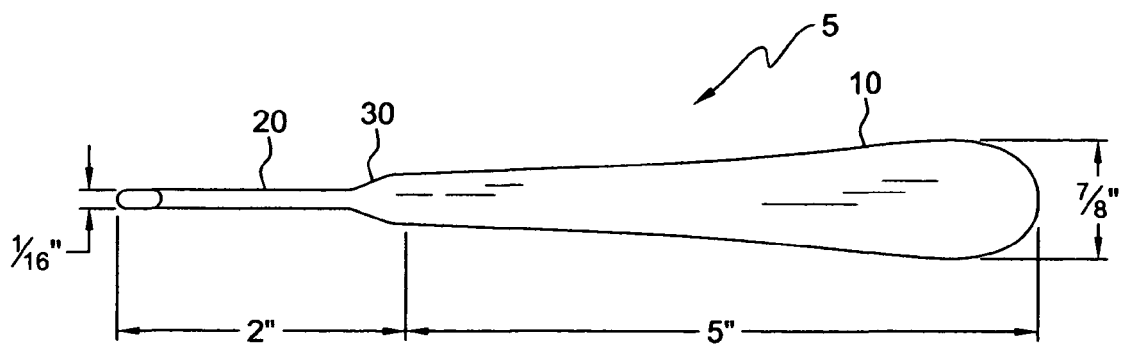
FIG. 5 is a top elevational view of the sandwich cookie dipper of FIGS. 3 and 4.
Figure 4A:
FIG. 4A is a side plan view of the a sandwich cookie dipper of FIG. 3, highlighting the partial circumference subtended by an arc length of about 180° or π radians.
Figure 4B:
FIG. 4B is a side plan view of the a sandwich cookie dipper of FIG. 3, highlighting the partial circumference subtended by an arc length of about 150° or 5π/6 radians.

From the side view of FIG. 4, the cookie cradle (20) has a depth of about 3/16". From the elevational view of FIG. 5, the cookie cradle (20), that is, the thin, curved cylindrical rod or arm-like portion comprising the cookie cradle has a width of preferably 1/16". The cookie cradle width is limited to accommodate the gap between the two sandwich cookies. That is, the width of the cookie cradle (20) must be sufficient to maintain the weight of the cookie without undue bending but narrow enough so that it may be inserted (preferably snugly) into the gap between the cookie members at the outside diameter of the crème layer. The cookie cradle rod or holder extends into the gap and contacts the crème layer, and some part of the inside walls at the outer circumferential edge of the two cookie members for about half (preferably, the lower half to realize support from gravity) the circumference of the cookie (its outer arc length subtended by π radians i.e., $\phi = \pi$ radians, or 180°, as shown in FIG. 4A). FIG. 4B shows an embodiment where the partial circumference forming the cradle (20) is subtended by an angle of about 150° or 5/6π radians. The cookie cradle (20) thereby holds the sandwich cookie stably without dislodging (before and after dipping) with normal movements. The partial circumference of the cookie cradle (20), however, is not limited to 180° or 150°, but may be equivalent to an arc length subtended by an angle of between 120° and 180°.

In an embodiment, a tip of the cookie cradle (20) at a side opposite the connecting element (30) is formed with a rubber coating and/or is rounded to prevent injury to the cookie eater who might somehow strike him/herself, or others, with the sandwich cookie dipper (5). Such mishaps can occur when people including young children handle any kind of tool or eating utensil. In one variation, the cookie cradle (20) may be specially formed so that it collapses upon contact with anything solid, i.e., is substantially limp, but not so limp as to be unable to maintain its curved shape, which follows the curved shape of the sandwich cookie, in order to avoid injury even if contacting a child's unprotected eye.

For that matter, while the sandwich cookie holder (5), handle (10), connecting element (30) and cookie cradle (20) should exhibit a particular resiliency to allow for flexibility, the resiliency should be limited in order to limit the ability of cookie dippers to be used to "launch" dry or dipped cookies as cookie projectiles when placed in the cookie holder (20).

Figure 6:
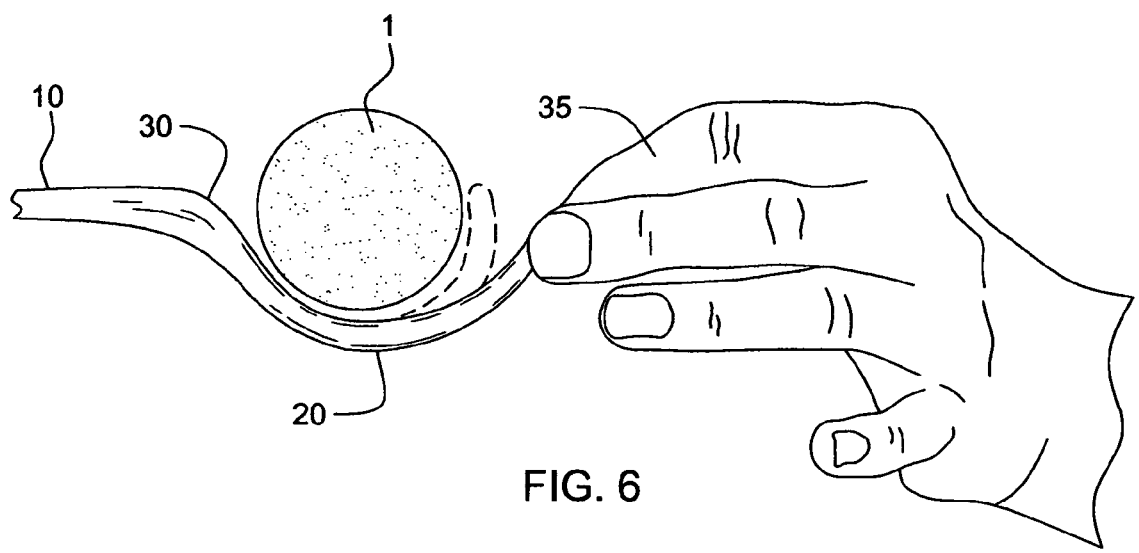
FIG. 6 is a side view of an embodiment of the sandwich cookie dipper being grasped to allow snug placement of a sandwich cookie thereon.

FIG. 6 depicts operation of a sandwich cookie dipper (5) where an end of the cookie cradle (20) is grasped by at least one finger (35) to expand and enlarge a radius of its arc length to accommodate a cookie (1) therein. Upon release of the grasping and expanding force, with the seating of the cookie, i.e., the arm-like part inserted between the disk-like members and contacting the outer circumference of the crème layer, the original shape returns. While the nature of the invention including the rod or arm-like cookie cradle (20) may operate to hold securely sandwich cookies that have a radius that is smaller that a radius of the curved part of the cradle, it is preferable that the radius of the curved part of the cradle is less than or equal to that of the cookie.

Figure 7A:
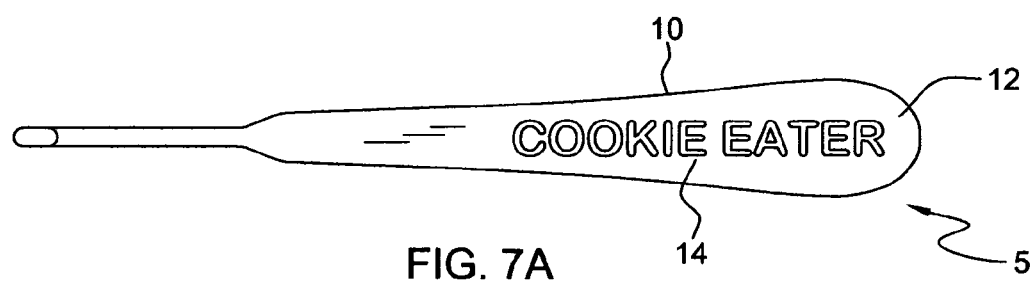
FIGS. 7A and 7B are top plan view of a sandwich cookie dipper whereupon a portion of the handle includes a communication.
Figure 7B:
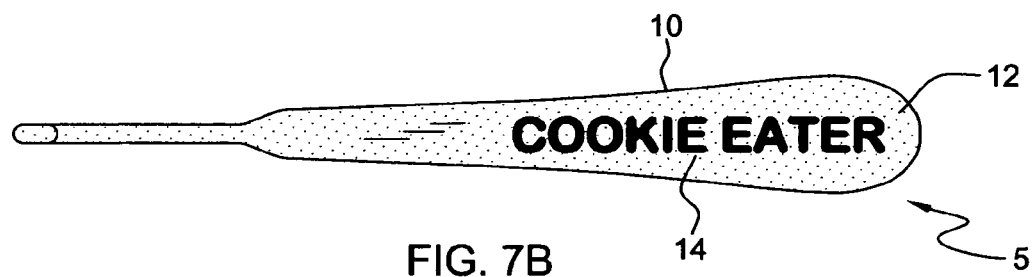

In FIGS. 7A and 7B, sandwich cookie dipper (5) is shown wherein one portion (14) of a top side (12) of handle (10) is utilized to communicate information to cookie eaters and others. For example, the phrase "COOKIE EATER" is shown as an example of a communication. A communication such as COOKIE EATER, or some other brand name or logo might be somehow embossed, printed, formed, stencilled, etc., on portion (14), for advertising purposes, promotional purposes or just to make the inventive sandwich cookie dipper more fun to use.

A communication comprising a brand mark or logo might be included in packages of some type sandwich cookies sold under the brand mark or logo, at the point of sale. Alternatively, a sandwich cookie dipper so marked might be used to promote a product, for example, it could be mailed to purchasers of a particular brand of sandwich cookie (associated with the brand mark or logo) upon request by a cookie eater/purchaser as "promotion."

While not shown in FIGS. 7A and 7B, the same or an alternative communication can be provided on a side of handle (10) opposite the side (12) or some other portion of sandwich cookie dipper (5), without deviating from the intended scope of the invention. For that matter, while a communication might take a form of an advertisement, such as shown, the communication might alternatively be merely a shape, or known image or caricature, such as a Disney character or comic book character, without limitation. It follows that the handle may comprise any shape, texture, color, etc., without deviating from the intended scope and spirit of the invention, in order to attract users.

FIGS. 8A and 8B are front perspective and side views of another embodiment of a sandwich cookie dipper (5') of the invention, which includes a 3D shape or character. Sandwich cookie dipper (5') includes a handle (10), which, like the sandwich cookie dippers (5) shown in FIGS. 6A and 6B, includes a top side (12) upon which a communication may be exhibited. For that matter, the communication may be exhibited on the handle's other side, both sides of the handle, or any other part of the dipper which might take a communication marking. A transition (30') connected to and integral with the handle (10) comprises an elephant's head, where the trunk extending from the elephant's face comprises the cookie cradle (20'). Sandwich cookies are placed upon the cookie cradle (20') such that the rod-like portion is arranged against the outer circumference of the crème layer (by gravity), between the cookie members and the cookie may be dipped and moved about with minimal likelihood of dislodging, as described in detail above.

FIGS. 9A and 9B are front perspective and side views of yet another embodiment of a sandwich cookie dipper (5") of the invention, where part of the cookie dipper comprises a 3D shape or character. Sandwich cookie dipper (5") includes cookie cradle (20) that is quite similar or equivalent to cookie cradle (20) of sandwich cookie dipper (5), as shown above, as is the transition (30) of sandwich cookie dipper (5"). The handle (10'), however, comprises a lion's head, as shown. Of course sandwich cookie dipper (5") operates in accordance with the inventive principles, where a child or other person grasps the lion's head to manipulate the dipper.

It should be noted that while sandwich cookie dipper (5') of FIGS. 8A and 8B, and sandwich cookie dipper (5") of FIGS. 9A and 9B, are formed with an elephant head at transition (30'), and a lion's head at handle (10'), respectively, the invention is not limited to these animal parts, or animal parts in particular. Any character, caricature, 3D shape, animal shape, fish, fowl, dinosaur, airplane, rocket ship, boat, etc., without limitation, may comprise the respective handle (10') or transition (20'), or both, without deviating from the scope and spirit of the invention.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended claims.

What is claimed is:

1. A sandwich cookie dipper, comprising:
   a handle;
   a cookie cradle; and
   a transition element that interconnects to and sets off the cookie cradle from the handle;
   wherein the cookie cradle comprises a thin, resilient, cylindrical rod member is formed from a rod material that extends down and away from a central axis of the handle, along a half-moon path which loops back upwards to a point aligned with the central axis,
   wherein the half-moon path follows a partial circumference of a circle defined by a radius that is smaller than or equal to a radius of a sandwich cookie to be cradled and is equivalent to an arc length of a circle defined by and subtended by an angle of between 120° and 180°,
   wherein the rod member is configured to substantially conform to a part of an outer circumference of a crème layer sandwiched between two cookie members of the sandwich cookie and to cradle the sandwich cookie when positioned on the cradle.

2. The sandwich cookie dipper as set forth in claim 1, wherein the angle subtending the arc length is 180°.

3. The sandwich cookie dipper as set forth in claim 1, wherein the cookie cradle is configured to be stretched or expanded to receive the sandwich cookie, wherein upon relaxation after stretching operates to grip a portion of the outer circumference of the crème layer.

4. The sandwich cookie dipper as set forth in claim 1, wherein the handle, the cookie cradle and the transition element are formed as one piece.

5. The sandwich cookie dipper as set forth in claim 4, wherein the handle, the cookie cradle and the transition element are formed as one piece by injection molding.

6. The sandwich cookie dipper as set forth in claim 1, wherein the handle, the cookie cradle and the transition element are formed of plastic.

7. The sandwich cookie dipper as set forth in claim 1, wherein at some part of the cookie cradle is formed of a material selected from the group consisting of rubber, plastic and composite material for safety purposes.

8. The sandwich cookie dipper as set forth in claim 1, wherein at least one surface is included upon which at least one communication is disposed.

9. The sandwich cookie dipper as set forth in claim 8, wherein the at least one surface is at least one surface of the handle.

10. The sandwich cookie dipper as set forth in claim 1, wherein the handle is formed as a three-dimensional shape.

11. The sandwich cookie dipper as set forth in claim 8, wherein the three-dimensional shape is a facial replica or caricature.

12. The sandwich cookie dipper as set forth in claim 1, wherein the transition is formed as a three-dimensional shape.

13. The sandwich cookie dipper as set forth in claim 12, wherein the three-dimensional shape is a facial replica or caricature.

* * * * *